United States Patent
Bolkhovitin et al.

(10) Patent No.: US 10,642,525 B2
(45) Date of Patent: May 5, 2020

(54) MULTIPLE-STAGE DATA LIFETIME MANAGEMENT FOR STORAGE DEVICES

(71) Applicant: Western Digital Technologies, Inc., San Diego, CA (US)

(72) Inventors: Vladislav Bolkhovitin, San Jose, CA (US); Sanjay Subbarao, Irvine, CA (US); Brian W. O'Krafka, Austin, TX (US); Anand Kulkarni, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 24 days.

(21) Appl. No.: 15/902,988

(22) Filed: Feb. 22, 2018

(65) Prior Publication Data

US 2019/0179559 A1   Jun. 13, 2019

Related U.S. Application Data

(60) Provisional application No. 62/596,073, filed on Dec. 7, 2017.

(51) Int. Cl.
*G06F 12/02* (2006.01)
*G06F 3/06* (2006.01)
*G06F 11/10* (2006.01)

(52) U.S. Cl.
CPC ............ *G06F 3/0649* (2013.01); *G06F 3/064* (2013.01); *G06F 3/0608* (2013.01);
(Continued)

(58) Field of Classification Search
CPC ................................ G06F 12/00; G06F 12/02
USPC ....................................................... 711/165
See application file for complete search history.

(56) References Cited

U.S. PATENT DOCUMENTS 6,008,987 A     12/1999   Gale et al.
9,740,609 B1 *   8/2017   Ahmed ............... G06F 12/0246
(Continued)

FOREIGN PATENT DOCUMENTS

DE    102005063281    7/2007
EP         2066158    6/2009
(Continued)

OTHER PUBLICATIONS

International Search Report and Written Opinion dated Nov. 22, 2017 received in International Patent Application No. PCT/US2017/050194, which corresponds to U.S. Appl. No. 15/491,915, 14 pages (Van Assche).

(Continued)

*Primary Examiner* — Gautam Sain
(74) *Attorney, Agent, or Firm* — Morgan, Lewis & Bockius LLP

(57) ABSTRACT

A main controller in a data storage system having multiple storage devices determines an initial set of memory block candidates for data lifetime operations by receiving from each of a plurality of the storage devices information identifying one or more potential memory block candidates, with respective received memory blocks having been classified by respective storage devices as potential candidates. The main controller determines a set of related memory blocks, and, based on received usage information for the candidate memory blocks and the related memory blocks, selects a target group of memory blocks and initiates performance of the data lifetime operations on the memory blocks of the selected target group.

21 Claims, 7 Drawing Sheets

(52) U.S. Cl.
CPC .......... *G06F 3/0616* (2013.01); *G06F 3/0683* (2013.01); *G06F 11/1092* (2013.01); *G06F 12/02* (2013.01); *G06F 12/0253* (2013.01)

(56) References Cited

U.S. PATENT DOCUMENTS

| | | |
|---|---|---|
| 2008/0236791 A1 | 10/2008 | Wayman |
| 2012/0124312 A1 | 5/2012 | Vemuri et al. |
| 2012/0170224 A1 | 7/2012 | Fowler et al. |
| 2015/0058535 A1* | 2/2015 | Lasser ................ G06F 12/0246 711/103 |
| 2016/0041887 A1* | 2/2016 | Davis .................... G06F 3/0619 714/6.2 |
| 2016/0092304 A1* | 3/2016 | Tabrizi ................ G06F 11/1072 |
| 2016/0110270 A1 | 4/2016 | Iwashita |
| 2016/0179637 A1 | 6/2016 | Winokur |
| 2016/0217049 A1 | 7/2016 | Bali et al. |
| 2017/0139590 A1* | 5/2017 | Hsu ........................ G06F 3/061 |

FOREIGN PATENT DOCUMENTS

| | | |
|---|---|---|
| EP | 2395827 | 12/2011 |
| FR | 2560731 | 9/1985 |
| JP | H066064 | 1/1994 |

OTHER PUBLICATIONS

International Search Report and International Written Opinion of International Patent Application PCT/US2015/016656, dated May 18, 2015, 13 pages.

\* cited by examiner

MULTIPLE-STAGE DATA LIFETIME MANAGEMENT FOR STORAGE DEVICES

RELATED APPLICATIONS

This application claims priority to U.S. Provisional Patent Application No. 62/596,073, filed Dec. 7, 2017, which is hereby incorporated by reference in its entirety.

TECHNICAL FIELD

The disclosed embodiments relate generally to memory systems, and in particular, to efficiently performing data lifetime management operations on multiple storage devices (e.g., each storage device comprising one or more flash memory devices).

BACKGROUND

Managing data lifetime operations, such as garbage collection operations, in data storage systems with multiple storage devices requires significant memory and computational resources that increase with the size of the storage system. With each additional storage device in a multi-device storage system, extra memory and CPU resources are required to globally manage data lifetime of the system, which negatively affects system scalability. Moreover, data may have non-trivial relationships between storage devices, which further complicates global data lifetime management in a multi-device storage system.

SUMMARY

Without limiting the scope of the appended claims, after considering this disclosure, and particularly after considering the section entitled "Detailed Description," one will understand how the aspects of various embodiments are implemented and used to manage data lifetime in a storage system with multiple storage devices. In one aspect, a controller determines an initial set of memory block candidates for data lifetime operations by receiving from each of a plurality of storage devices information identifying one or more potential memory block candidates, with respective received blocks having been classified by respective storage devices as candidate blocks. The controller determines a set of related memory blocks, and, based on received usage information for the candidate blocks and the related blocks, selects a target group of memory blocks and initiates performance of the data lifetime operations on the memory blocks of the selected target group.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

Figure 1A:
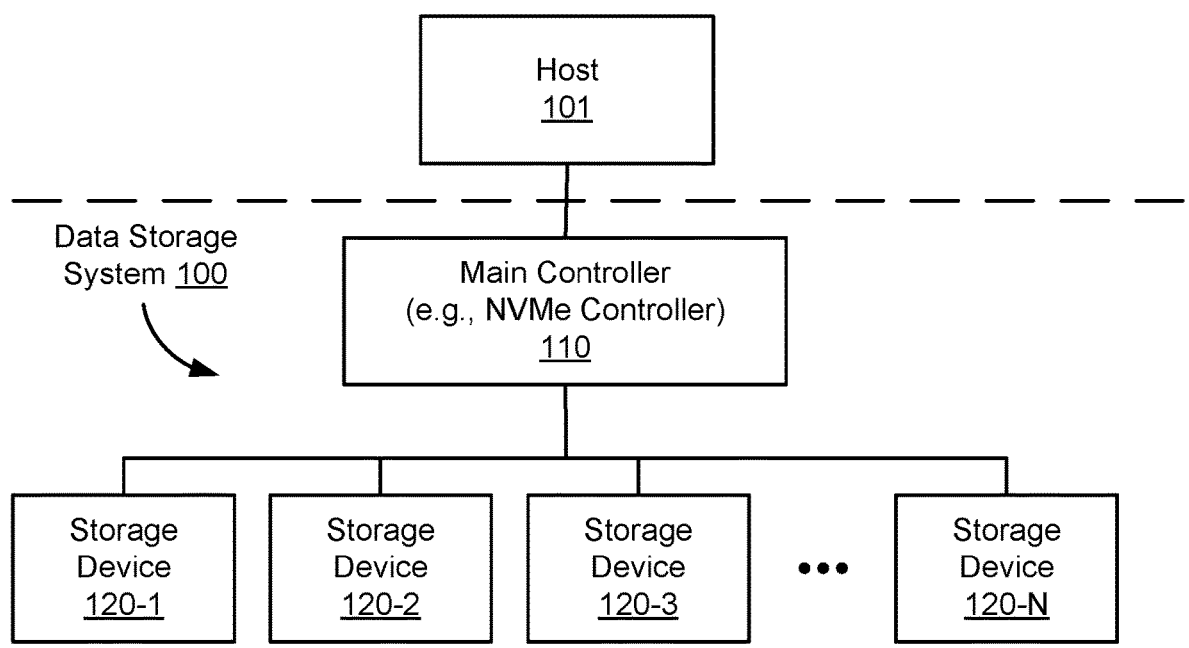
FIGS. 1A-1B are block diagrams illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Figure 1B:
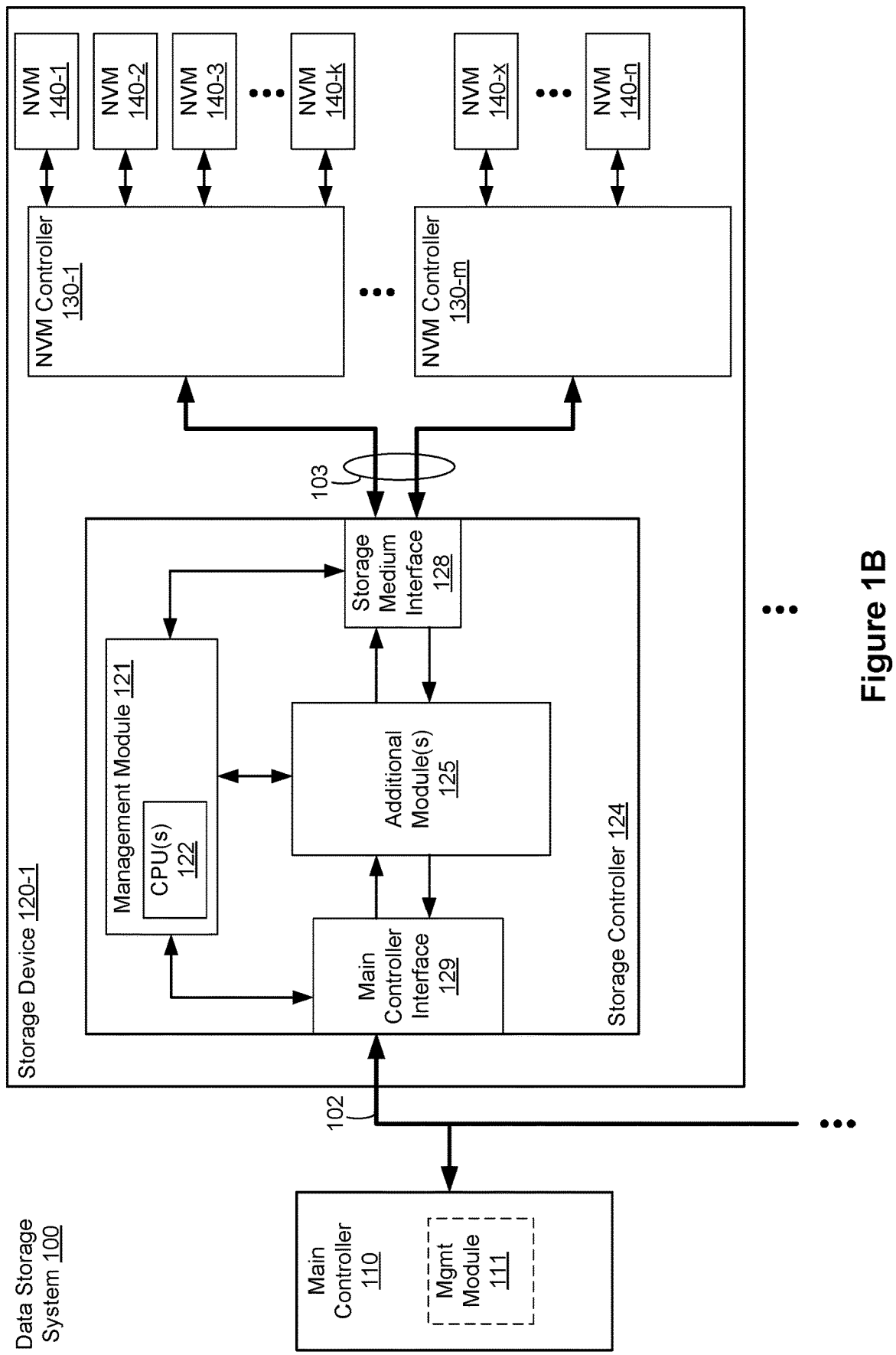

The various implementations described herein include systems, methods and/or devices that may more efficiently manage data lifetime for storage devices in a multi-device storage environment (e.g., storage devices 120 with non-volatile memory (NVM) devices 140 in storage environment 100, FIGS. 1A-1B).

FIGS. 1A-1B are block diagrams illustrating data storage system 100, in accordance with some embodiments. While some example features are illustrated, various other features have not been illustrated for the sake of brevity and so as not to obscure pertinent aspects of the example embodiments disclosed herein. To that end, as a non-limiting example, data storage system 100 includes one or more storage devices 120 (also sometimes called information storage devices, data storage devices, or memory devices). Each storage device 120 includes a storage controller 124 and non-volatile memory (e.g., one or more NVM device(s) 140 such as one or more flash memory devices), which are used in conjunction with main controller 110 (e.g., an NVMe controller). In some embodiments, storage device includes one or more non-volatile memory (NVM) controllers 130 such as flash controllers or channel controllers (e.g., for storage devices having NVM devices in multiple memory channels), while in other embodiments the NVM devices are controlled by storage controller 124 without intervening NVM controllers 130.

In some embodiments, storage device 120 includes a single NVM device while in other embodiments storage device 120 includes a plurality of NVM devices. In some embodiments, NVM devices 140 include NAND-type flash memory or NOR-type flash memory. Further, in some embodiments, NVM controllers 130, if included in storage device 120, are solid-state drive (SSD) controllers. However, other types of storage media may be included in accordance with aspects of a wide variety of embodiments (e.g., PCRAM, ReRAM, STT-RAM, MRAM, etc.). In some embodiments, a flash memory device includes one or more flash memory die, one or more flash memory packages, one or more flash memory channels or the like.

Main controller 110 is coupled to storage controller 124 through data connections 102. However, in some embodiments main controller 110 includes storage controller 124, or a portion of storage controller 124, as a component and/or a subsystem. For example, in some embodiments, some or all of the functionality of storage controller 124 is implemented by software executed on main controller 110. Main controller 110 is sometimes called a controller system, a non-volatile memory express (NVMe) controller, garbage collection (GC) leader, or storage virtualization controller. In some embodiments, a storage controller 124 or NVM controller 130 associated with a particular storage device (e.g., 120-1) acts as a main controller 110 for other storage devices (e.g., 120-2, 120-3, and 120-N) in data storage system 100. In some embodiments, main controller 110 is a component and/or subsystem of host 101 (described below).

Figure 2A:
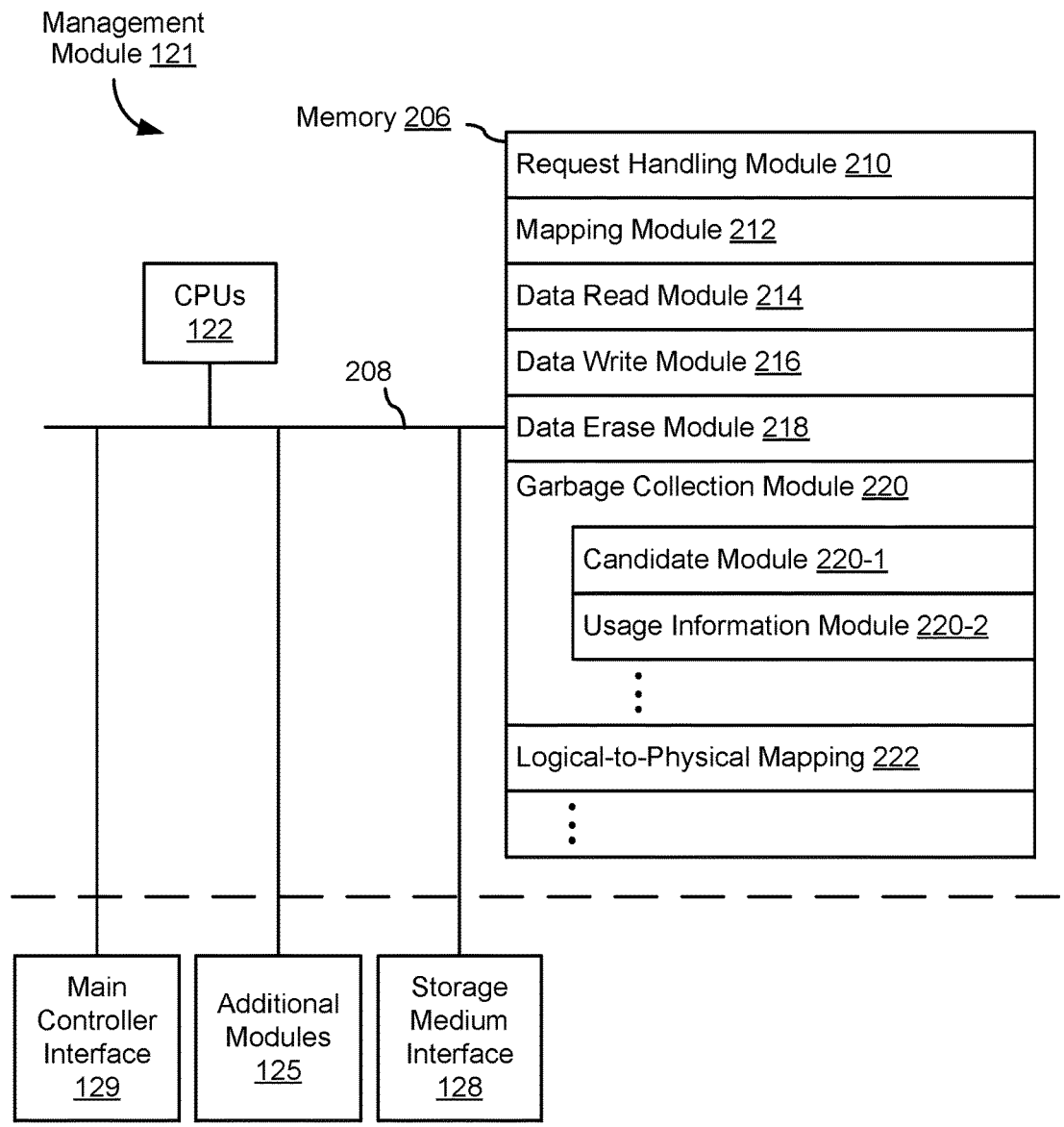
FIGS. 2A-2B are block diagrams illustrating implementations of management modules, in accordance with some embodiments.
Figure 2B:
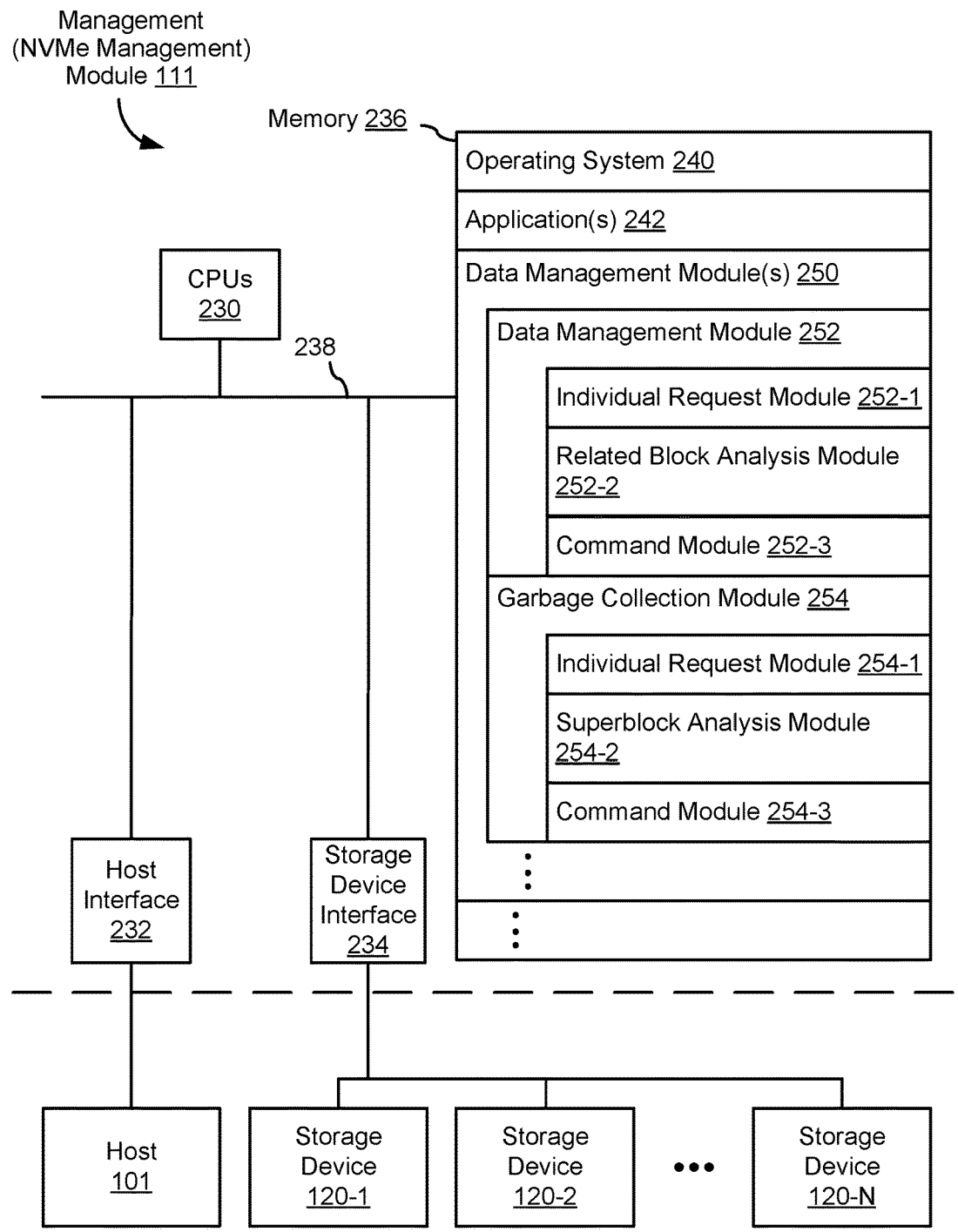

In some embodiments, host 101 is coupled to data storage system 100 through host interface 232 (FIG. 2B). In some embodiments, multiple hosts 101 (only one of which is shown in FIG. 1A) are coupled to data storage system 100 through host interface 232, which may be a storage network interface or other interface capable of supporting communications with multiple hosts 101.

Host 101, or a respective host in a system having multiple hosts, may be any suitable computer device, such as a computer, a laptop computer, a tablet device, a netbook, an internet kiosk, a personal digital assistant, a mobile phone, a smart phone, a gaming device, a computer server, or any other computing device. Host 101 is sometimes called a host system, client, or client system. In some embodiments, host 101 is a server system, such as a server system in a data center. In some embodiments, the one or more hosts 101 are one or more host devices distinct from the main controller 110 and distinct from the plurality of storage devices 120; but in some other embodiments, the one or more hosts 101 include one of the storage devices 120 that has been configured to perform data processing operations and to send data storage commands to access data stored in the one or more storage devices 120. In some other embodiments, the one or more hosts 101 are configured to store and access data in the plurality of storage devices 120.

In some embodiments, main controller 110 includes one or more processors, one or more types of memory, a display and/or other user interface components such as a keyboard, a touch screen display, a mouse, a track-pad, a digital camera, and/or any number of supplemental devices to add functionality. In some embodiments, main controller 110 does not have a display and other user interface components.

The one or more NVM controllers 130, if included in a respective storage device 120, are coupled with storage controller 124 through connections 103. Connections 103 are sometimes called data connections, but typically convey commands in addition to data, and optionally convey metadata, error correction information and/or other information in addition to data values to be stored in NVM devices 140 and data values read from NVM devices 140. In some embodiments, however, storage controller 124, the one or more NVM controllers 130, and NVM devices 140 are included in the same device (i.e., an integrated device) as components thereof. Furthermore, in some embodiments, one or more of the storage devices 120 (e.g., including storage controller 124, the one or more NVM controllers 130, and NVM devices 140) are embedded in a host device (e.g., main controller 110 or host 101), such as a mobile device, tablet, other computer or computer controlled device, and the methods described herein are performed, at least in part, by the embedded storage controller. In some embodiments, storage controller 124 is configured to control, and is directly coupled to, one or more NVM devices 140, rendering one or more (or all) of the NVM controllers 130 optional or unnecessary.

In some embodiments, a storage device 120 includes NVM devices 140 such as flash memory devices (e.g., NVM devices 140-1 through 140-k, and NVM devices 140-x through 140-n) and NVM controllers 130 (e.g., NVM controllers 130-1 through 130-m). Viewed another way, a storage device 120 includes m memory channels, each of which has an NVM controller 130 and a set of NVM devices 140 coupled to the NVM controller 130, where m is an integer greater than one. However, in some embodiments, two or more memory channels share an NVM controller 130. In either example, each memory channel has its own distinct set of NVM devices 140. In a non-limiting example, the number of memory channels in a typical storage device is 8, 16, or 32. In another non-limiting example, the number of NVM devices 140 per memory channel is typically 8, 16, 32, or 64. Furthermore, in some embodiments, the number of NVM devices 140 is different in different memory channels.

In some embodiments, each NVM controller of NVM controllers 130 includes one or more processing units (also sometimes called CPUs or processors or microprocessors or microcontrollers) configured to execute instructions in one or more programs (e.g., in NVM controllers 130). In some embodiments, the one or more processors are shared by one or more components within, and in some cases, beyond the function of NVM controllers 130. NVM devices 140 are coupled to NVM controllers 130 through connections that typically convey commands in addition to data, and optionally convey metadata, error correction information and/or other information in addition to data values to be stored in NVM devices 140 and data values read from NVM devices 140. NVM devices 140 may include any number (i.e., one or more) of memory devices including, without limitation, non-volatile semiconductor memory devices, such as flash memory device(s).

For example, flash memory device(s) (e.g., NVM devices 140) can be configured for enterprise storage suitable for applications such as cloud computing, for database applications, primary and/or secondary storage, or for caching data stored (or to be stored) in secondary storage, such as hard disk drives. Additionally and/or alternatively, flash memory device(s) (e.g., NVM devices 140) can also be configured for relatively smaller-scale applications such as personal flash drives or hard-disk replacements for personal, laptop, and tablet computers. Although flash memory devices and flash controllers are used as an example here, in some embodiments storage device(s) 120 include other non-volatile memory device(s) and corresponding non-volatile storage controller(s).

In some embodiments, NVM devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

In some embodiments, storage controller 124 includes a management module 121, a main controller interface 129, a storage medium (I/O) interface 128, and additional module(s) 125. Storage controller 124 may include various additional features that have not been illustrated for the sake of brevity and so as not to obscure pertinent features of the example embodiments disclosed herein, and a different arrangement of features may be possible.

Main controller interface 129 provides an interface to main controller 110 through data connections 102. Similarly, storage medium interface 128 provides an interface to non-volatile memory (via NVM controllers 130, if included in storage device 120) though connections 103. In some embodiments, storage medium interface 128 includes read and write circuitry, including circuitry capable of providing reading signals to NVM controllers 130 (e.g., reading threshold voltages for NAND-type flash memory) or to NVM device 140 if storage device 120 does not include NVM controllers. In some embodiments, connections 102 and connections 103 are implemented as a communication media over which commands and data are communicated, using a protocol such as NVMe, DDR3, SCSI, SATA, SAS, or the like.

In some embodiments, management module 121 includes one or more processing units 122 (sometimes herein called CPUs, processors, or hardware processors, and sometimes implemented using microprocessors, microcontrollers, or the like) configured to execute instructions in one or more programs (e.g., in management module 121). In some embodiments, the one or more CPUs 122 are shared by one or more components within, and in some cases, beyond the function of storage controller 124. Management module 121 is coupled to main controller interface 129, additional module(s) 125 and storage medium interface 128 in order to coordinate the operation of these components. In some embodiments, one or more modules of management module 121 are implemented in management module 111 of main controller 110. In some embodiments, one or more processors of main controller 110 (not shown) are configured to execute instructions in one or more programs (e.g., in management module 111). In some embodiments, management module 111 is coupled to storage device(s) 120 in order to manage the operation of storage device(s) 120.

Additional module(s) 125 are coupled to storage medium interface 128, main controller interface 129, and management module 121. As an example, additional module(s) 125 may include an error control module to limit the number of uncorrectable errors inadvertently introduced into data during writes to memory and/or reads from memory. In some embodiments, additional module(s) 125 are executed in software by the one or more CPUs 122 of management module 121; in other embodiments, additional module(s) 125 are implemented in whole or in part using special purpose circuitry (e.g., to perform encoding and decoding functions). In some embodiments, additional module(s) 125 are implemented in whole or in part by software executed on main controller 110.

In some embodiments, an error control module, included in additional module(s) 125, includes an encoder and a decoder. In some embodiments, the encoder encodes data by applying an error-correcting code (ECC) to produce a codeword, which is subsequently stored in NVM devices 140. When encoded data (e.g., one or more codewords) is read from NVM devices 140, the decoder applies a decoding process to the encoded data to recover the data, and to correct errors in the recovered data within the error correcting capability of the error-correcting code. Those skilled in the art will appreciate that various error-correcting codes have different error detection and correction capacities, and that particular codes are selected for various applications for reasons beyond the scope of this disclosure. As such, an exhaustive review of the various types of error-correcting codes is not provided herein. Moreover, those skilled in the art will appreciate that each type or family of error-correcting codes may have encoding and decoding algorithms that are particular to the type or family of error-correcting codes. On the other hand, some algorithms may be utilized at least to some extent in the decoding of a number of different types or families of error-correcting codes. As such, for the sake of brevity, an exhaustive description of the various types of encoding and decoding algorithms generally available and known to those skilled in the art is not provided herein.

In some embodiments, during a write operation, main controller interface 129 receives data to be stored in NVM devices 140 from main controller 110. The data received by main controller interface 129 is made available to an encoder (e.g., in additional module(s) 125), which encodes the data to produce one or more codewords. The one or more codewords are made available to storage medium interface 128, which transfers the one or more codewords to NVM devices 140 (e.g., through NVM controllers 130) in a manner dependent on the type of storage medium being utilized.

In some embodiments, a read operation is initiated when main controller 110 sends one or more read commands (e.g., via data connections 102, or alternatively a separate control line or bus) to storage controller 124 requesting data from NVM devices 140. The one or more read commands, sometimes called host read commands, are typically initiated by (and thus received by main controller 110 from) a host 101, but in some circumstances one or more of the read commands can be initiated by an application or process running on in of the storage devices 120-1 to 120-N (see FIG. 1A). Storage controller 124 sends one or more read access commands to NVM devices 140 (e.g., through NVM controllers 130), via storage medium interface 128, to obtain raw read data in accordance with memory locations (addresses) specified by the one or more read commands. The read access commands correspond to the read commands, but the read commands are converted by storage controller 124 into read access commands, for example so as to be directed to one or more specific NVM device 140.

In response to the one or more read access commands sent to the NVM devices 140, storage medium interface 128 receives raw read data (e.g., comprising one or more codewords) from one or more NVM devices and provides the raw read data to a decoder (e.g., in additional module(s) 125). If the decoding is successful, the decoded data is provided to main controller interface 129, where the decoded data is made available to main controller 110. In some embodiments, if the decoding is not successful, storage controller 124 may resort to a number of remedial actions or provide an indication of an irresolvable error condition.

As explained above, a storage medium (e.g., NVM devices 140) is divided into a number of addressable and individually selectable blocks and each block is optionally (but typically) further divided into a plurality of pages and/or word lines and/or sectors. While erasure of data from a storage medium is performed on a block basis, in many embodiments, reading and programming of the storage medium is performed on a smaller subunit of a block (e.g., on a page basis, word line basis, or sector basis). In some embodiments, the smaller subunit of a block consists of multiple memory cells (e.g., single-level cells or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types: (1) a lower page (sometimes called the fast page), and (2) an upper page (sometimes called the slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell. In some embodiments, the encoding format of the storage media (i.e., TLC, MLC, or SLC and/or a chosen data redundancy mechanism or ECC code) is a choice made when data is actually written to the storage media.

As an example, if data is written to a storage medium in pages, but the storage medium is erased in blocks, pages in the storage medium may contain invalid (e.g., stale) data, but those pages cannot be overwritten until the whole block containing those pages is erased. In order to write to the pages with invalid data, the pages (if any) with valid data in that block are read and re-written to a new block and the old block is erased (or put on a queue for erasing). This process is called garbage collection. After garbage collection, the new block contains the pages with valid data and may have free pages that are available for new data to be written, and the old block can be erased so as to be available for new data to be written. Since flash memory can only be programmed and erased a limited number of times, the efficiency of the algorithm used to pick the next block(s) to re-write and erase has a significant impact on the lifetime and reliability of flash-based storage systems.

Write amplification is a phenomenon where the actual amount of physical data written to a storage medium (e.g., NVM devices 140 in storage device 120) is a multiple of the logical amount of data written by a host (e.g., host 101, or main controller 110, sometimes called a host) to the storage medium. As discussed above, when a block of storage medium must be erased before it can be re-written, the garbage collection process to perform these operations results in re-writing data one or more times. This multiplying effect increases the number of writes required over the life of a storage medium, which shortens the time it can reliably operate. The formula to calculate the write amplification of a storage system is given by equation:

$$\frac{\text{amount of data written to a storage medium}}{\text{amount of data written by a host}}$$

One of the goals of any flash memory based data storage system architecture is to reduce write amplification as much as possible so that available endurance is used to meet storage medium reliability and performance specifications. Higher system endurance also results in lower cost as the storage system may need less over-provisioning. By reducing write amplification, the endurance of the storage medium is increased and the overall cost of the storage system is decreased. Generally, garbage collection is performed on erase blocks with the fewest number of valid pages for best performance and best write amplification.

Flash memory devices utilize memory cells to store data as electrical values, such as electrical charges or voltages. Each flash memory cell typically includes a single transistor with a floating gate that is used to store a charge, which modifies the threshold voltage of the transistor (i.e., the voltage needed to turn the transistor on). The magnitude of the charge, and the corresponding threshold voltage the charge creates, is used to represent one or more data values. In some embodiments, during a read operation, a reading threshold voltage is applied to the control gate of the transistor and the resulting sensed current or voltage is mapped to a data value.

The terms "cell voltage" and "memory cell voltage," in the context of flash memory cells, means the threshold voltage of the memory cell, which is the minimum voltage that needs to be applied to the gate of the memory cell's transistor in order for the transistor to conduct current. Similarly, reading threshold voltages (sometimes also called reading signals and reading voltages) applied to a set of flash memory cells (e.g., the flash memory cells in a selected page) are gate voltages applied to the gates of the flash memory cells to determine whether the memory cells conduct current at that gate voltage. In some embodiments, when a flash memory cell's transistor conducts current at a given reading threshold voltage, indicating that the cell voltage is less than the reading threshold voltage, the raw data value for that read operation is a "1" and otherwise the raw data value is a "0."

FIG. 2A is a block diagram illustrating a management module 121, in accordance with some embodiments, as shown in FIG. 1B. Management module 121 typically includes one or more processing units 122 (sometimes herein called CPUs, processors, or hardware processors, and sometimes implemented using microprocessors, microcontrollers, or the like) for executing modules, programs, and/or instructions stored in memory 206 and thereby performing processing operations, memory 206 (sometimes called controller memory), and one or more communication buses 208 for interconnecting these components. The one or more communication buses 208 optionally include circuitry (sometimes called a chipset) that interconnects and controls communications between system components. Management module 121 is coupled to main controller interface 129, additional module(s) 125, and storage medium interface 128 by the one or more communication buses 208. Memory 206 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from CPU(s) 122. Memory 206, or alternatively the non-volatile memory device(s) within memory 206, comprises a non-transitory computer readable storage medium. In some embodiments, memory 206, or the non-transitory computer readable storage medium of memory 206 stores the following programs, modules, and data structures, or a subset or superset thereof:

- request handling module 210 for receiving input/output (I/O) requests from a host or main controller (e.g., write requests and/or read requests, sometimes called write command and read commands, or host write commands and host read commands);
- mapping module 212 for mapping logical addresses to physical addresses using logical-to-physical mapping 222;
- data read module 214 data for reading data, or causing data to be read, from storage device 120 (e.g., NVM devices 140);
- data write module 216 for writing data, or causing data to be written, to storage device 120 (e.g., NVM devices 140);
- data erase module 218 for erasing data, or causing data to be erased, from storage device 120 (e.g., NVM devices 140);

garbage collection module 220 for performing a garbage collection process on one or more memory portions (i.e., blocks) of storage device 120 (e.g., NVM devices 140);
  candidate module 220-1 for identifying memory devices (e.g., NVM devices 140) as candidates for management operations (e.g., garbage collection);
  usage information module 220-2 for collecting usage information of memory devices (e.g., NVM devices 140); and
logical-to-physical mapping 222 storing a logical-to-physical map (used, for example, by mapping module 212), which maps logical addresses recognized by the host (e.g., main controller 110 and/or host 101, FIGS. 1A-1B) to physical addresses of storage device 120 (e.g., NVM devices 140).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the non-transitory computer readable storage medium of memory 206, provide instructions for implementing some of the methods described below. In some embodiments, some or all of these modules may be implemented with specialized hardware circuits that subsume part or all of the module functionality.

Although FIG. 2A shows a management module 121, FIG. 2A is intended more as functional description of the various features which may be present in a management module than as a structural schematic of the embodiments described herein. In practice, and as recognized by those of ordinary skill in the art, items shown separately could be combined and some items could be separated. In some embodiments, one or more of the operations and/or modules of management module 121 may instead be performed and/or implemented by management module 111. In some embodiments, one or more of the operations and/or modules of management module 121 may instead be performed and/or implemented by NVM controllers 130. For example, each NVM controller includes garbage collection logic (e.g., similar to garbage collection module 220, FIG. 2A) for managing data lifetime of corresponding NVM devices. In some embodiments, garbage collection module 220 may be implemented in whole or in part by software, hardware, firmware, or any combination thereof in data storage system 100 (FIGS. 1A-1B). Lifetime management operations may include, for example, garbage collection operations, data compaction operations, read disturb handling operations, and data scrubbing operations.

FIG. 2B is a block diagram illustrating a management module 111, in accordance with some embodiments, as shown in FIG. 1B. Management module 111 typically includes one or more processing units 230 (sometimes herein called CPUs, processors, or hardware processors, and sometimes implemented using microprocessors, microcontrollers, or the like) for executing modules, programs, and/or instructions stored in memory 236 and thereby performing processing operations, memory 236 (sometimes called main controller memory), and one or more communication buses 238 for interconnecting these components. The one or more communication buses 238 optionally include circuitry (sometimes called a chipset) that interconnects and controls communications between system components. Management module 111 is coupled to one or more hosts 101 by host interface 232, and is coupled to storage device(s) 120 by storage device interface 234. Memory 236 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 236 optionally includes one or more storage devices remotely located from CPU(s) 230. Memory 236, or alternatively the non-volatile memory device(s) within memory 236, comprises a non-transitory computer readable storage medium. In some embodiments, memory 236, or the non-transitory computer readable storage medium of memory 236 stores the following programs, modules, and data structures, or a subset or superset thereof:
  operating system 240 including procedures for handling various basic system services and for performing hardware dependent tasks;
  application(s) 242 including programs for facilitating and/or interacting with any of the modules of main controller 110 or host 101;
  data management module(s) 250 for managing data lifetime as described herein, including:
    one or more instances of a data management module 252, for running management operations on memory blocks (e.g., NVM devices 140) including:
      individual request module 252-1 for requesting information identifying memory block candidates and related memory blocks, and for requesting usage information for the memory blocks of interest;
      related block analysis module 252-2 for analyzing memory block candidates to determining related memory blocks, and for selecting groups of memory blocks for management operations; and
      command module 252-3 for sending requests to respective storage devices (e.g., storage devices 120) regarding usage information of specified memory blocks; and
    garbage collection module 254, which is a specific example or instance of a data management module 252, for running garbage collection on memory blocks (e.g., NVM devices 140) including:
      individual request module 254-1 for requesting information identifying memory block candidates and related memory blocks, and for requesting usage information for the memory blocks of interest;
      related block analysis module 254-2 for analyzing memory block candidates to determining related memory blocks, and for selecting groups of memory blocks for management operations; and
      command module 254-3 for sending requests to respective storage devices (e.g., storage devices 120) regarding usage information of specified memory blocks.

Each of the data management modules 250, such as data management module 252 and garbage collection 254, is used to manage, and perform various tasks to extend, data lifetime of the storage medium in the data storage device 120 of data storage system 100 (FIG. 1A).

Each of the above identified elements of management module 111 may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 236 may store a subset of the modules and data structures identified above. Furthermore, memory 236 may store additional modules and data structures not described above. In some embodiments, the programs, modules, and data structures stored in memory 236, or the non-transitory computer readable storage medium of memory 236, provide instructions for implementing some of the methods described below. In some embodiments, some or all of these modules may be implemented with specialized hardware circuits that subsume part or all of the module functionality.

Although FIG. 2B shows a management module 111, FIG. 2B is intended more as functional description of the various features which may be present in a management module than as a structural schematic of the embodiments described herein. In practice, and as recognized by those of ordinary skill in the art, items shown separately could be combined and some items could be separated. In some embodiments, one or more of the operations and/or modules of management module 111 may instead be performed and/or implemented by management module 121. In some embodiments, one or more of the operations and/or modules of management module 111 may instead be performed and/or implemented by NVM controllers 130. For example, management module 121 of storage device 120-1 includes data management logic (e.g., similar to data management module 252, FIG. 2B) for managing data lifetime of memory blocks (e.g., memory devices 140) of one or more of the storage devices 120-2 through 120-N. In some embodiments, data management module 252 and garbage collection module 254 may be implemented in whole or in part by software, hardware, firmware, or any combination thereof in data storage system 100 (FIGS. 1A-1B).

As noted above, in some embodiments, main controller 110 is implemented by a host system (e.g., host 101, FIG. 1A) that also stores and accesses data in the plurality of storage devices 120 (e.g., see FIG. 1A). Furthermore, in some embodiments, main controller 110 is implemented by a storage device (e.g., storage device 120-1, FIG. 1A) in the multi-device storage environment. For example, it may be implemented as a part of storage controller 124.

Figure 3A:
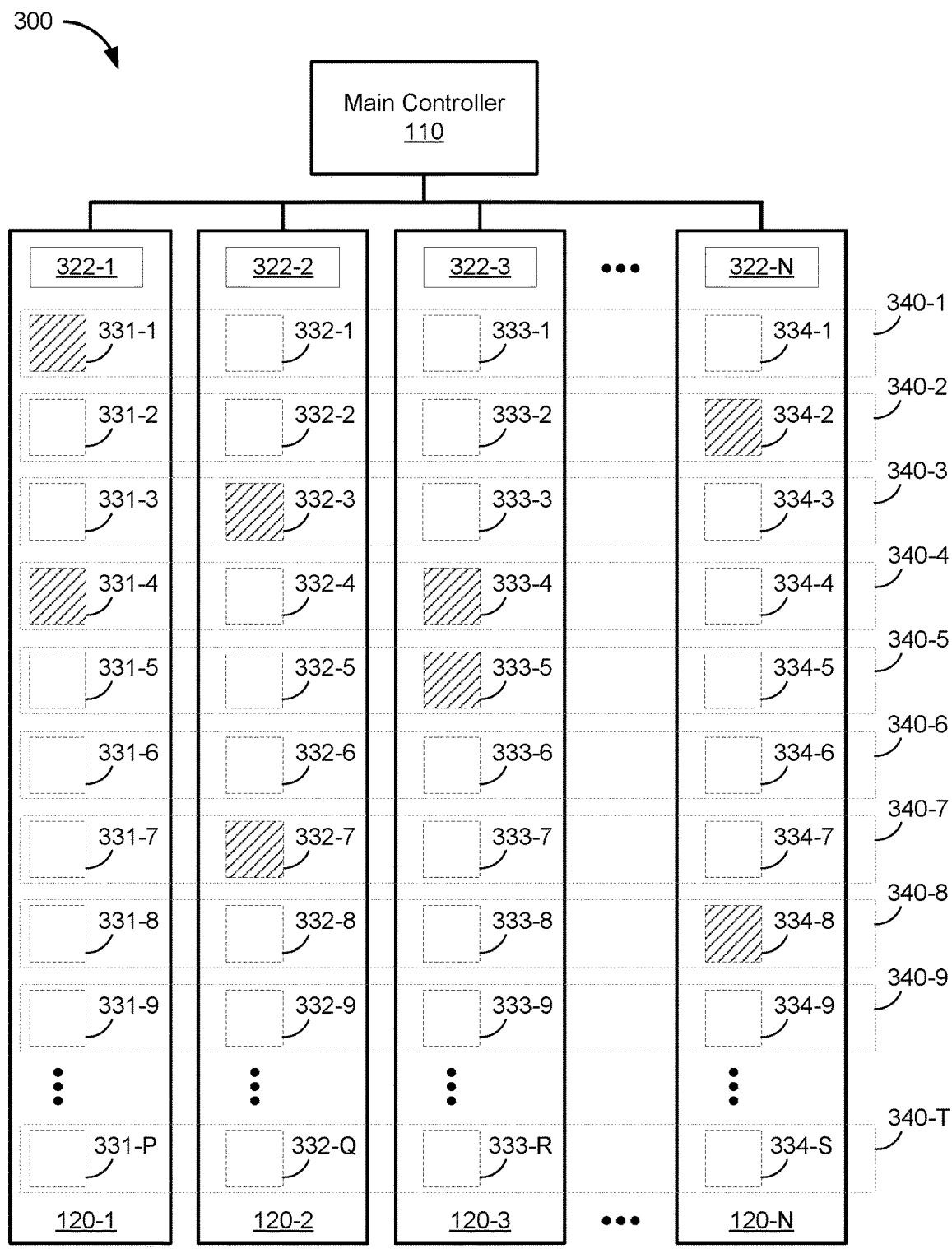
FIGS. 3A-3B are block diagrams illustrating an implementation of a data storage system, in accordance with some embodiments.
Figure 3B:
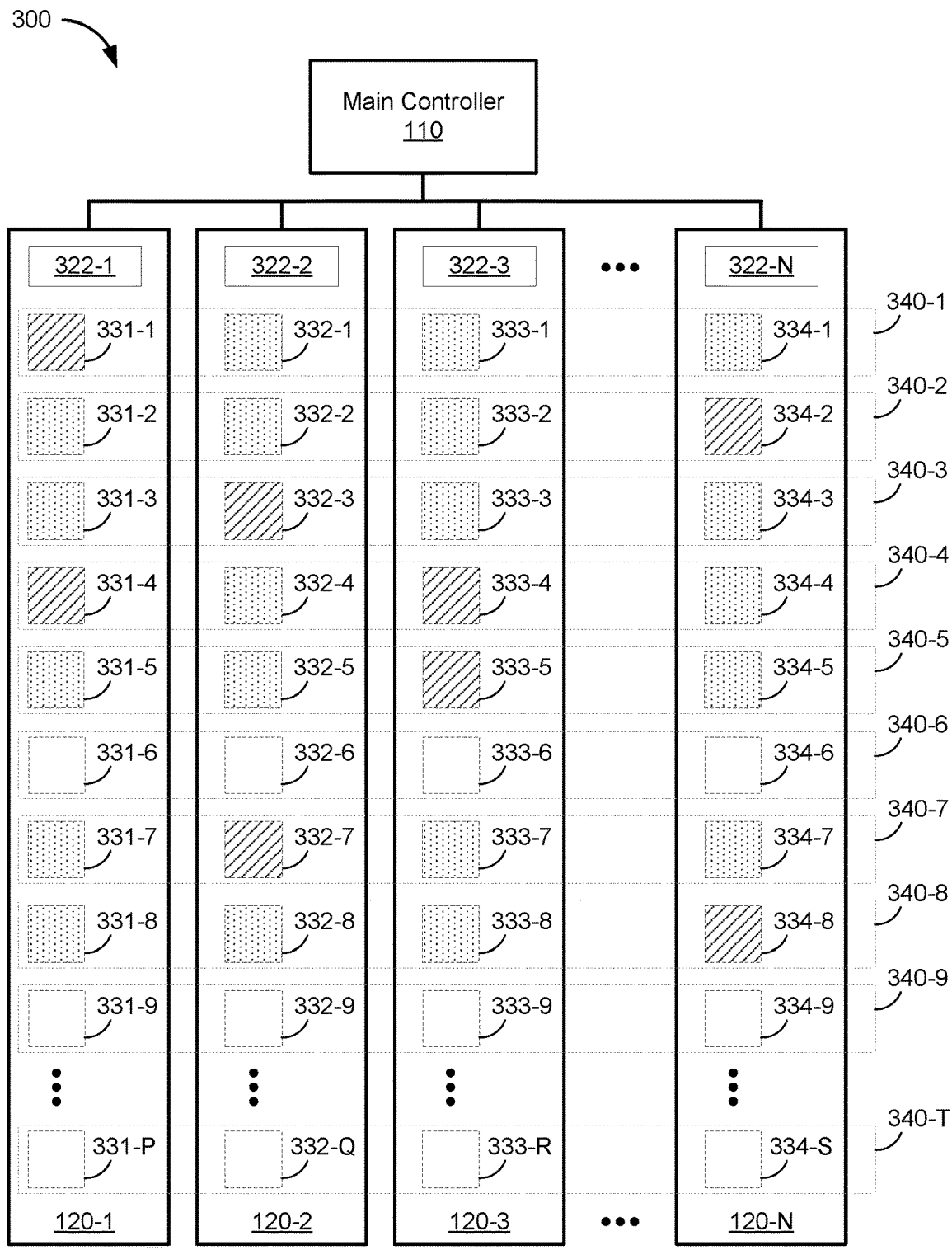

FIGS. 3A-3B are block diagrams of an example data storage system 300 corresponding to data storage system 100 (FIGS. 1A-1B). Data storage system 300 includes a main controller 110 and N storage devices 120, where N is an integer greater than 1, or greater than 2, and in some implementations greater than or equal to 8, 15, 16, or 32.

Each storage device 120 includes a storage controller 322 (e.g., corresponding to storage controller 124; see FIG. 1B and related discussion above). More particularly, storage device 120-1 includes storage controller 322-1, storage device 120-2 includes storage controller 322-2, storage device 120-3 includes storage controller 322-3, and storage device 120-N includes storage controller 322-N. Each storage controller 322 includes a management module 121 (FIG. 2A) for managing and performing tasks local to the storage device 120, such as data lifetime management operations (e.g., garbage collection).

Each storage device 120 includes a plurality of memory blocks 331, 332, 333, or 334 (corresponding to NVM devices 140, FIG. 1B). More particularly, storage device 120-1 includes P memory blocks 331, storage device 120-2 includes Q memory blocks 332, storage device 120-3 includes R memory blocks 333, and storage device 120-N includes S memory blocks 334, where P, Q, R, S, and N are integers greater than 1, and in various embodiments, greater than or equal to 64, 128, 256 or 512. In various embodiments, none of, or any two or more of P, Q, R, S, and N may be equal. Stated another way, system 300 includes a plurality of memory devices 120, with each memory device including a plurality of memory blocks (e.g., 331, 332, etc.). In various embodiments, memory blocks 331-334 are units of memory comprising partial pages, pages, a set of multiple pages smaller than an erase block, codewords, erase blocks (i.e., the minimum size unit of memory that can be erased in a single erase operation), a set of two or more erase blocks, or die planes. For ease of explanation, the following discussion refers to units of memory as memory blocks.

In some embodiments, data stored in a memory block in one storage device (e.g., block 331-1 in device 120-1) has a non-trivial relationship (sometimes referred to herein as a dependent relationship) with data stored in a memory block in another storage device (e.g., block 332-1 in device 120-2). In some embodiments, such related memory blocks belong to predefined groups of memory blocks. Examples of predefined groups of memory blocks include groups of memory blocks in error correction stripes (e.g., RAID stripes), or more generally, groups of memory blocks sharing redundant data or error correction data or metadata. For example, a dependent relationship may result from data in two or more blocks being included in a single error correction process (e.g., an error correction stripe). In storage system 300, data in memory blocks 331-1, 332-1, 333-1, and 334-1 form group 340-1 (e.g., error correction stripe 340-1), data in memory blocks 331-2, 332-2, 333-2, and 334-2 form group 340-2 (e.g., error correction stripe 340-2), and so forth. In all, storage system 300 includes T groups of memory blocks, also herein called sets of related memory blocks, where T is an integer greater than 1. While groups 340 (e.g., error correction stripes) are illustrated as including one block in each storage device 120, and while each block 331-334 is depicted as forming part of group 340, those skilled in the art will appreciate that various other combinations of blocks and groups of blocks are possible. For instance, in some embodiments, one or more blocks 331-334 are not included in any group 340, and in some embodiments, one or more groups 340 include memory blocks in only a subset of the storage devices 120 present in the storage system (e.g., the storage system may include N storage devices 120, such as 34 storage devices, while each group or stripe 340 includes memory blocks from 17 storage devices).

Figure 4:
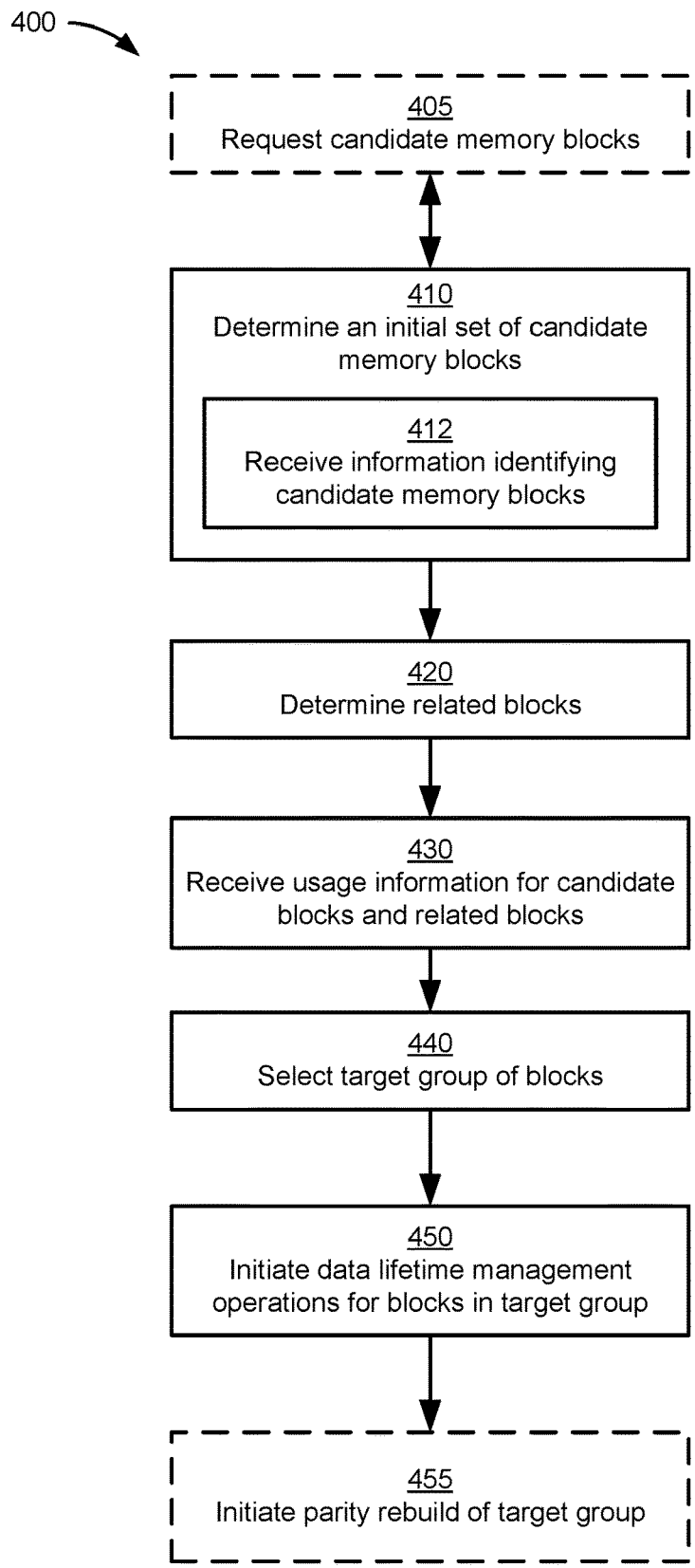
FIG. 4 illustrates a flowchart diagram of a method of a method of managing a storage system, in accordance with some embodiments.

FIG. 4 illustrates a flowchart diagram of a method of managing data lifetime in a multi-device storage system, in accordance with some embodiments. In some embodiments, method 400 is performed at least in part by a controller (e.g., main controller 110, FIGS. 1A-1B) of the storage system (e.g., data storage system 100, FIGS. 1A-1B), the controller having one or more processors and memory. The controller is configured to be operatively coupled with a host (e.g., host 101, FIG. 1A) and one or more storage devices (e.g., storage device(s) 120, FIGS. 1A-1B) which include one or more memory devices (e.g., NVM devices 140, such as flash memory devices). For example, in some embodiments, method 400 is performed by a controller (e.g., an NVMe controller), corresponding generally to main controller 110 in FIGS. 1A-1B, or a component thereof (e.g., management module 111, FIG. 1B). In another example, in some embodiments, method 400 is performed by a storage controller 124 of a particular storage device 120 (FIG. 1B) in the multi-device storage system, or a component of the storage controller 124 (e.g., management module 121, FIG. 1B) or a respective storage device 120. In some embodiments, method 400 is governed by instructions that are stored in a non-transitory computer readable storage medium (e.g., memory 206, FIG. 2A, and/or memory 236, FIG. 2B) and the instructions are executed by one or more processors of a respective controller or storage device (e.g., CPU(s) 122, FIG. 2A, and/or CPU(s) 230, FIG. 2B). Optional operations are indicated by dashed lines (e.g., boxes with dashed-line borders).

In method 400, a controller (e.g., main controller 110, FIG. 3A, or as discussed above, a main controller implemented within a storage device) receives (412) from one or more storage devices (e.g., devices 120, FIG. 3A) information identifying one or more memory block candidates. Each memory block candidate of the identified memory block candidates is located in a respective storage device, and has been determined by the respective storage device to be a candidate for a data lifetime management operation (e.g., garbage collection, data compaction operation, read disturb handling operation, data scrubbing operation). For example, referring to FIG. 3A, storage device 120-1 has identified memory blocks 331-1 and 331-4 as candidates, storage device 120-2 has identified memory blocks 332-3 and 332-7 as candidates, storage device 120-3 has identified memory blocks 333-4 and 333-5 as candidates, and storage device 120-N has identified memory blocks 334-2 and 334-8 as candidates. In a more specific example, storage devices 120-1, 120-2, 120-3 and 120-N each identify M (e.g., 2, or more generally an integer number) of erase blocks having meeting predefined selection criteria, for example erase blocks having the smallest number of valid pages. In some embodiments, the predefined selection criteria, for selecting or identifying candidate erase blocks, include two or more selection criteria or factors, such a number of valid pages, and whether the erase block or any portion thereof has a read count (e.g., a count equal to a number of read operations that have been performed on the erase block, or the portion of the erase block, since the last time the erase block was erased) that exceeds a predefined read count threshold (sometimes called a read disturb threshold). In FIGS. 3A-3B, candidate memory blocks are indicated by a striped fill pattern (such as the pattern used in block 331-1).

In some embodiments, the main controller optionally requests (405) that each storage device independently perform a management operation local to the respective storage device (herein referred to as a "local management operation" or a "first stage management operation"). For example, referring to FIG. 3A, main controller 110 requests that one or more storage devices 120 perform local management operations, and that each of the one or more storage devices 120 send respective results of the respective local management operations to main controller 110 (e.g., by sending information identifying respective memory block candidates to main controller 110). Results received by main controller 110 in this fashion can be referred to as having been received synchronously, as a result of synchronous local management operations from the storage devices 120.

In some embodiments, one or more storage devices, unprompted by the main controller, asynchronously perform local management operations and send respective results to the main controller. Then, in some embodiments, after having received results from a subset of the storage devices, the main controller requests that the rest of the storage devices in the multi-device storage system perform local management operations and send their respective results to the main controller. For example, referring to FIG. 3A, controllers 322-1 and 322-2, unprompted by main controller 110, each perform local management operations in storage devices 120-1 and 120-2, respectively, and send information identifying respective memory block candidates to main controller 110. Then, having received results from a subset of the storage devices 120, main controller 110 prompts controllers 322-3 through 322-N in storage devices 120-3 through 120-N, respectively, to perform local management operations and send their respective results to main controller 110.

The main controller (e.g., main controller 110, FIG. 3A) determines (410) an initial set of memory block candidates based on the received memory block candidates (412). In some embodiments, the main controller determines an initial set of candidates upon receiving results from a subset of storage devices (e.g., a predetermined percentage of storage devices in the multi-device environment, such as 25%, 50%, or 75%). In other embodiments, the main controller determines an initial set of candidates upon receiving results from all of the storage devices in the multi-device environment.

In some embodiments, receiving information identifying candidate memory blocks from a respective storage device additionally or alternatively includes receiving information pertaining to other aspects of the respective storage device. For example, main controller 110 receives, synchronously or asynchronously, drive-level information for one or more storage devices 120 (e.g., a total amount or percentage of valid or invalid data across all memory blocks in a respective storage device).

Next, the main controller determines (420) a set of related memory blocks, related to the initial set of memory block candidates. In FIG. 3B, related memory blocks are indicated by a dotted fill pattern (such as the pattern used in block 332-1). In some embodiments, the main controller determines the set of related memory blocks in accordance with predefined groups of memory blocks (e.g., groups of blocks having dependent relationships, as discussed above). In some embodiments, each predefined group of memory blocks includes memory blocks in two or more data storage devices in the multi-device storage environment. In some embodiments, each predefined group of memory blocks is or includes a distinct superblock in a set of superblocks, where each superblock in the set of superblocks is a minimum size unit of memory for performing the management operation. For example, referring to FIG. 3B, upon receiving information identifying memory block candidates 331-1 and 331-4 from storage device 120-1, main controller 110 determines that block 331-1 is included in error correction stripe 340-1, and that block 331-4 is included in error correction stripe 340-4; upon receiving information identifying memory block candidates 332-3 and 332-7 from storage device 120-2, main controller 110 determines that block 332-3 is included in error correction stripe 340-3, and that block 332-7 is included in error correction stripe 340-7; and so forth. In the example illustrated in FIG. 3B, the set of related memory blocks includes all memory blocks included in the identified error correction stripes 340. More particularly, upon identifying block 331-1 as being included in stripe 340-1, main controller 110 determines that blocks 332-1, 333-1, and 334-1 are related to block 331-1, and therefore belong to the set of related memory blocks; upon identifying block 333-5 as being included in stripe 340-5, main controller 110 determines that blocks 331-5, 332-5, and 334-5 are related to block 333-5, and therefore belong to the set of related memory blocks. As noted above, candidate memory blocks (e.g., block 331-1) are identified in FIG. 3B with striped fill patterns, and related memory blocks (e.g., block 332-1) are identified by dotted fill patterns.

In some embodiments, determining the set of related memory blocks includes identifying groups of memory blocks that include the initial set of memory block candidates, and identifying, as the set of related memory blocks, memory blocks in the identified groups of memory blocks that are not included in the initial set of memory blocks. For example, referring to FIG. 3B, main controller 110 identifies group 340-4 as including two of the initial set of memory block candidates (blocks 331-4 and 333-4), and proceeds to identify as related memory blocks only the blocks in group 340-4 that have not already been identified as memory block candidates (blocks 332-4 and 334-4), so as to not classify the same block as both a candidate memory block and a related memory block.

Next, the main controller receives (430) usage information for the initial set of memory block candidates and the set of related memory blocks. For example, referring to FIG. 3B, main controller 110 receives usage information from the initial set of memory block candidates (the blocks depicted with a striped fill pattern, such as block 331-1) and the set of related memory blocks (the blocks depicted with shading or a dotted fill pattern, such as block 332-1). In some embodiments, receiving (430) the usage information includes sending a request (e.g., a command) for the requested usage information to each of the storage devices in which candidate blocks and related blocks are located. For example, referring to FIG. 3B, main controller 110 sends a vectored command (a single command requesting multiple items), or a plurality of commands, to storage device 120-1, requesting usage information for blocks 331-1, 331-2, 331-3, 331-4, 331-5, 331-7, and 331-8; a vectored command (or a plurality of commands) to storage device 120-2, requesting usage information for blocks 332-1, 332-2, 332-3, 332-4, 332-5, 332-7, and 332-8; and so forth. Stated another way, main controller 110 sends one or more commands per storage device 120 for requested information for all candidate memory blocks and related memory blocks within each respective storage device, and each respective storage device reports the requested information. An example of usage information received by the main controller for a respective memory block is information from or corresponding to a usage counter (e.g., a number of times the respective memory block has been read, written or erased), and another example of usage information received by the main controller for a respective memory block is information indicating or concerning the amount of valid data (or, conversely, the amount of invalid data) in the respective memory block. The aforementioned example of usage information are examples of memory block-level usage information. In some embodiments, requested and received usage information includes device-level usage or health information (e.g., a spare pool size, and/or quantity of available overprovisioning (e.g., usable memory or blocks in excess of the memory capacity, sometimes called declared capacity, of the storage device that is available to a host for storing data, etc.).

Next, the main controller selects (440) one or more target groups of memory blocks based on the received usage information for the candidate memory blocks and the related memory blocks. For example, referring to FIG. 3B, main controller 110 selects group 340-7 as the target group, based on a determination that memory blocks 331-7, 332-7, 333-7, and 334-7 belong to the group of memory blocks having the greatest need for lifetime management operations based on the usage information for the candidate memory blocks and related memory blocks. In some embodiments, the target group selection is based on an evaluation of data lifetime management criteria. Examples of data lifetime management criteria include quantities of valid data, or invalid data, in each the identified groups of memory blocks (e.g., for a garbage collection operation), or read counts in the identified groups of memory blocks (e.g., for a read disturb handling operation). For example, the group with the least valid data, or the most invalid data, is selected as a target group for garbage collection, unless one or more groups include one or memory blocks with a read count in excess of a read disturb threshold, in which case one or more of the group(s) with such memory blocks are selected as a target group for read disturb handling (e.g., garbage collection, which includes copying valid data in the selected group(s) to new storage locations).

In some embodiments in which the main controller receives device-level health information, the main controller uses the received device-level health information in making the target group selection. For example, if main controller 110 receives device-level health information with a predefined health metric that satisfies a predetermined threshold (e.g., a spare pool of erase blocks having a size (e.g., number of erased blocks) below a predefined threshold) for a particular storage device 120, then main controller 110 uses that information by selecting a target group of memory blocks 340 that includes a memory block in the particular storage device 120 (e.g., a memory block in the particular storage device having the lowest amount of valid data), even if that result is different from the result (e.g., selection of a different target group of memory blocks) that would be obtained if the device-level health information were not used by the main controller in making the target group selection.

Next, the main controller initiates (450) performance of a data lifetime management operation (e.g., a garbage collection operation, a data compaction operation, a read disturb handling operation, or a data scrubbing operation) on the selected one or more target groups of memory blocks. For example, referring to FIG. 3B, main controller 110 initiates a garbage collection operation on group 340-7 by sending a command to controller 322-1 of storage device 120-1 to garbage collect block 331-7, sending a command to controller 322-2 of storage device 120-2 to garbage collect block 332-7, sending a command to controller 322-3 of storage device 120-3 to garbage collect block 333-7, and sending a command to controller 322-4 of storage device 120-N to garbage collect block 334-7.

Optionally, the main controller initiates (455) a parity rebuild on the selected target group of memory blocks after the data lifetime management operation. For example, if the data lifetime management operation would make parity information for the selected target group invalid or out of date, a parity rebuild is performed, either in response to one or more explicit commands by the main controller, or as an integral part of performing the data lifetime management operation.

It should be understood that the particular order in which the operations in FIG. 4 have been described is merely exemplary and is not intended to indicate that the described order is the only order in which the operations could be performed. One of ordinary skill in the art would recognize various ways to reorder the operations described herein.

It will be understood that, although the terms "first," "second," etc. may be used herein to describe various elements, these elements should not be limited by these terms. These terms are only used to distinguish one element from another. For example, a first region could be termed a second region, and, similarly, a second region could be termed a first region, without changing the meaning of the description, so long as all occurrences of the "first region" are renamed consistently and all occurrences of the "second region" are renamed consistently. The first region and the second region are both regions, but they are not the same region.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the phrase "at least one of A, B, and C" is to be construed to require one or more of the listed items, and this phase reads on a single instance of A alone, a single instance of B alone, or a single instance of C alone, while also encompassing combinations of the listed items such "one or more of A and one or more of B without any of C," and the like.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of managing data lifetime in a multi-device storage environment, the method comprising:
   at a main controller communicatively coupled to a plurality of storage devices, each of the plurality of storage devices having a respective controller and a respective plurality of memory blocks:
      determining an initial set of memory block candidates, including receiving, from each respective controller of the plurality of storage devices, information identifying one or more memory block candidates, wherein each memory block candidate of the identified memory block candidates (i) is located in a respective plurality of memory blocks of a respective storage device of the plurality of storage devices and (ii) has been determined by the respective controller to be a candidate for a management operation;
      determining a set of related memory blocks, related to the initial set of memory block candidates in accordance with predefined groups of memory blocks sharing redundant data or error correction data, including a first related memory block located in a storage device distinct from a storage device in which a corresponding memory block candidate is located;
      receiving usage information for the initial set of memory block candidates and the set of related memory blocks;
      selecting a target group of memory blocks of the predefined groups of memory blocks based on the received usage information for the initial set of memory block candidates and set of related memory blocks; and
      initiating performance of the management operation on the selected target group of memory blocks.

2. The method of claim 1, wherein each predefined group of memory blocks includes memory blocks in two or more storage devices in the plurality of storage devices.

3. The method of claim 1, wherein:
   each predefined group of memory blocks comprises a distinct superblock in a set of superblocks; and
   each superblock in the set of superblocks is a minimum size unit of memory for performing the management operation.

4. The method of claim 1, wherein the received usage information includes:
   usage information for individual respective memory blocks; and
   storage device health information for the two or more storage devices.

5. The method of claim 1, wherein the management operation is a garbage collection operation, a data compaction operation, a read disturb handling operation, or a data scrubbing operation.

6. The method of claim 1, wherein determining the set of related memory blocks comprises:
   identifying groups of memory blocks, in the predefined groups of memory blocks, that include the initial set of memory block candidates; and
   identifying, as the set of related memory blocks, memory blocks in the identified groups of memory blocks that are not included in the initial set of memory blocks.

7. The method of claim 1, wherein receiving the usage information comprises sending a command to each of the plurality of storage devices, each respective command including a request for usage information for memory block candidates and related memory blocks located in the respective storage device.

8. The method of claim 1, wherein the target group selection is based on an evaluation of data lifetime management criteria.

9. The method of claim 8, wherein the data lifetime management criteria includes garbage collection selection criteria, the garbage collection selection criteria including criteria with respect to quantities of valid data, or invalid data, in the identified groups of memory blocks.

10. The method of claim 8, wherein the data lifetime management criteria includes read disturb selection criteria, the read disturb selection criteria including criteria with respect to read counts in the identified groups of memory blocks.

11. The method of claim 1, further comprising initiating a parity rebuild on the selected target group of memory blocks.

12. The method of claim 1, wherein each of the memory blocks in the one or more memory block candidates and set of related memory blocks is a partial page, a page, a set of multiple pages smaller than an erase block, an erase block, or set of two or more erase blocks.

13. The method of claim 1, wherein:
the main controller is implemented by a host system; and
the host system also stores and accesses data in the plurality of storage devices.

14. The method of claim 1, wherein the main controller is implemented by a storage device in the plurality of storage devices.

15. The method of claim 1, wherein the main controller is a controller system distinct from and external to the plurality of storage devices.

16. The method of claim 15, wherein:
the main controller includes a host interface to receive host commands from one or more host systems external to the main controller, the host commands including host data access commands for storing and retrieving data; and
the main controller is configured, in response to receipt of the host data access commands, to generate and send corresponding storage commands to respective storage devices of the plurality of storage devices so as to store data in and retrieve data from the plurality of storage devices in accordance with the host data access commands.

17. A system for managing data lifetime in a multi-device storage environment, the system comprising:
a storage device interface for sending commands to and receiving responses from a plurality of storage devices, each of the plurality of storage devices having a respective controller and a respective plurality of memory blocks;
controller system memory; and
one or more processors configured to execute one or more programs stored in the controller system memory, the one or more programs including instructions for:
determining an initial set of memory block candidates, including receiving, via the storage device interface, from each respective controller of the plurality of storage devices, information identifying one or more memory block candidates, wherein each memory block candidate of the identified memory block candidates (i) is located in a respective plurality of memory blocks of a respective storage device of the plurality of storage devices and (ii) has been determined by the respective controller to be a candidate for a management operation;
determining a set of related memory blocks, related to the initial set of memory block candidates in accordance with predefined groups of memory blocks sharing redundant data or error correction data, including a first related memory block located in a storage device distinct from a storage device in which a corresponding memory block candidate is located;
receiving, via the storage device interface, usage information for the initial set of memory block candidates and the set of related memory blocks;
selecting a target group of memory blocks of the predefined groups of memory blocks based on the received usage information for the initial set of memory block candidates and set of related memory blocks; and
initiating performance of the management operation on the selected target group of memory blocks.

18. The system of claim 17, further comprising:
a host interface for receiving host data access commands from one or more hosts;
wherein:
the host data access commands are for storing and retrieving data, and
the one or more programs further include instructions for, in response to receipt of the host data access commands, generating and sending corresponding storage commands to respective storage devices of the plurality of storage devices so as to store data in and retrieve data from the plurality of storage devices in accordance with the host data access commands.

19. The system of claim 17, wherein each predefined group of memory blocks includes memory blocks in two or more storage devices in the plurality of storage devices.

20. The system of claim 17, wherein:
each predefined group of memory blocks comprises a distinct superblock in a set of superblocks; and
each superblock in the set of superblocks is a minimum size unit of memory for performing the management operation.

21. A system for managing data lifetime in a multi-device storage environment, the system comprising:
interface means for sending commands to and receiving responses from a plurality of storage devices, each of the plurality of storage devices having a respective controller and a respective plurality of memory blocks;
means for determining an initial set of memory block candidates, including receiving, via the interface means, from each respective controller of the plurality of storage devices, information identifying one or more memory block candidates, wherein each memory block candidate of the identified memory block candidates (i) is located in a respective plurality of memory blocks of a respective storage device of the plurality of storage devices and (ii) has been determined by the respective controller to be a candidate for a management operation;
means for determining a set of related memory blocks, related to the initial set of memory block candidates in accordance with predefined groups of memory blocks sharing redundant data or error correction data, including a first related memory block located in a storage device distinct from a storage device in which a corresponding memory block candidate is located;
means for receiving, via the interface means, usage information for the initial set of memory block candidates and the set of related memory blocks;
means for selecting a target group of memory blocks of the predefined groups of memory blocks based on the received usage information for the initial set of memory block candidates and set of related memory blocks; and
means for initiating performance of the management operation on the selected target group of memory blocks.

* * * * *